United States Patent
Frankenberger et al.

(10) Patent No.: US 8,545,943 B2
(45) Date of Patent: Oct. 1, 2013

(54) PAINTING DEVICE, PAINTING ARRANGEMENT, METHOD FOR PAINTING A CURVED SURFACE OF AN OBJECT, AND USE OF AN INKJET DEVICE FOR PAINTING AN AIRCRAFT

(75) Inventors: Eckart Frankenberger, Hamburg (DE); Thorsten Bergemann, Seevetal (DE); Heinz-Detlef Naeve, Muensterdorf (DE)

(73) Assignee: Airbus Operations GmbH (DE)

( * ) Notice: Subject to any disclaimer, the term of this patent is extended or adjusted under 35 U.S.C. 154(b) by 498 days.

(21) Appl. No.: 12/800,271

(22) Filed: May 12, 2010

(65) Prior Publication Data
US 2010/0279013 A1 Nov. 4, 2010

Related U.S. Application Data

(62) Division of application No. 11/227,618, filed on Sep. 15, 2005, now abandoned.

(60) Provisional application No. 60/609,998, filed on Sep. 15, 2004.

(30) Foreign Application Priority Data

Sep. 15, 2004 (DE) .......................... 10 2004 044 655

(51) Int. Cl.
*B05C 11/10* (2006.01)

(52) U.S. Cl.
USPC .................... 427/427.1; 427/427.2; 427/427.3

(58) Field of Classification Search
USPC ............ 427/427.1, 427.2, 427.3, 9; 118/323, 118/679, 680, 686, 712, 713; 901/43
See application file for complete search history.

(56) References Cited

U.S. PATENT DOCUMENTS

| 4,844,947 | A | 7/1989 | Kasner et al. |
|---|---|---|---|
| 4,907,765 | A | 3/1990 | Hirschel et al. |
| 5,060,594 | A | 10/1991 | Tomioka et al. |
| 5,248,341 | A | 9/1993 | Berry, Jr. et al. |
| 5,429,682 | A | 7/1995 | Harlow, Jr. et al. |
| 5,932,012 | A | 8/1999 | Ishida et al. |
| 5,968,271 | A | 10/1999 | Maxwell et al. |
| 6,096,132 | A | 8/2000 | Kaiba et al. |
| 6,159,296 | A | 12/2000 | Aoyama et al. |
| 6,345,791 | B1 * | 2/2002 | McClure ...................... 244/200 |

(Continued)

FOREIGN PATENT DOCUMENTS

| DE | 1129798 | 5/1962 |
|---|---|---|
| DE | 3534293 | 4/1987 |

(Continued)

*Primary Examiner* — George Koch
*(74) Attorney, Agent, or Firm* — Lerner, David, Littenberg, Krumholz & Mentlik, LLP

(57) ABSTRACT

A painting device for painting a curved surface (102) of an object (101), with a paint material ejection device (103), with a guide device (104, 105) and with a control device. The paint material ejection device (103) is designed for ejecting paint material. By means of the guide device (104, 105) the paint material ejection device (103) can be mechanically guided along a curved surface of an object. By means of the control device the paint material ejection device (103) and the guide device (104, 105) can be controlled in such a way that by means of guiding the paint material ejection device (103) along a predefinable path and by means of predefinable ejection of paint from the paint material ejection device (103) along the predefinable path a curved surface (102) of an object (101) to be painted can be painted.

12 Claims, 2 Drawing Sheets

(56) References Cited

U.S. PATENT DOCUMENTS

| | | |
|---|---|---|
| 6,484,121 B1 | 11/2002 | Filev et al. |
| 2003/0221615 A1 | 12/2003 | Lastowka |

FOREIGN PATENT DOCUMENTS

| | | |
|---|---|---|
| DE | 3609541 | 9/1987 |
| DE | 3737455 A1 | 5/1988 |
| DE | 9017288 U | 11/1991 |
| DE | 19631537 | 1/1998 |
| DE | 197 41 824 A1 | 4/1999 |
| DE | 101 34 159 A1 | 3/2002 |
| DE | 10139436 | 3/2003 |
| EP | 0 455 371 A2 | 11/1991 |
| EP | 1 228 811 A2 | 8/2002 |
| WO | 03/080257 A1 | 10/2003 |

* cited by examiner

PAINTING DEVICE, PAINTING ARRANGEMENT, METHOD FOR PAINTING A CURVED SURFACE OF AN OBJECT, AND USE OF AN INKJET DEVICE FOR PAINTING AN AIRCRAFT

CROSS-REFERENCE TO RELATED APPLICATIONS

This application is a divisional application of U.S. patent application Ser. No. 11/227,618 filed Sep. 15, 2005 now abandoned, which claims the benefit of the filing date of German Patent Application No. 2004 044 655.5 filed Sep. 15, 2004 and claims the benefit of the filing date of U.S. Provisional Patent Application No. 60/609,998 filed Sep. 15, 2004, the disclosures of each of which are hereby incorporated herein by reference.

BACKGROUND OF THE INVENTION

According to the state of the art, aircraft are painted using a complex method. In this method the individual paint coats to be provided are applied in several working stages (up to eight stages and more).

To apply logos, lettering and other visual effects it is in many cases necessary to spatially delimit those regions that need to be painted from those that do not need to be painted, and thus to stick a covering film on regions of an aircraft surface that do not need to be painted. This is necessary to obtain neat paint edges. However, this method is time-consuming and expensive. Furthermore, painting a finished aircraft, a process which frequently takes several days, is very cost-intensive because during this time the aircraft cannot yet commence operations.

Spraying the surface of an aircraft by means of spray guns requires a complex and expensive suction of solvents and aerosols. This work is very labour-intensive, requires specially trained expert staff and has to be carried out in protective suits.

Furthermore, working in a painting hall for the manual painting of an aircraft can be hazardous to the personnel involved, because in particular musculoskeletal disorders can frequently result from working in such a painting hall.

According to another method for implementing the visual design of the surface of an aircraft according to the state of the art, films with corresponding paint structures are applied to the surface. However, on curved surfaces, which occur in many places in particular in an aircraft, the application of films is difficult. Furthermore, films applied to the outer skin of aircraft are problematical during flight operations as far as electrostatic charging and electromechanical compatability (EMC) are concerned.

There may be a need to make it possible to paint a curved surface of an object at a high standard of quality and in a short time without creating hazardous conditions for the manpower.

This need may be met by a painting device, a painting arrangement, a method for painting a curved surface of an object, and the use having the features according to the independent claims.

SUMMARY OF THE INVENTION

The invention relates to a painting device for painting a curved surface of an object, a painting arrangement, a method for painting a curved surface of an object, and the use of a painting device for painting at least part of the surface of an aircraft.

According an exemplary embodiment a painting device, for painting a curved surface of an object, comprises a paint material ejection device, a guide device and a control device. The paint material ejection device is designed to eject paint material. It can be, for example, and without limitation, an inkjet device. By means of the guide device the paint material ejection device can be mechanically guided along a curved surface of an object. By means of the control device the paint material ejection device and the guide device can be controlled in such a way that by means of guiding the paint material ejection device along a predefinable path and by means of predefinable ejection of paint from the paint material ejection device along the predefinable path a curved surface of an object to be painted can be painted.

According to an exemplary embodiment a painting arrangement is created comprising an object with a surface to be painted and comprising a painting device featuring the above-described features for painting the surface of the object.

According to an exemplary embodiment in a method for painting a curved surface of an object paint material is ejected by means of a paint material ejection device. Furthermore, by means of a guide device the paint material ejection device is mechanically guided along a curved surface of an object. By means of a control device the paint material ejection device and the guide device are controlled such that by means of guiding the paint material ejection device along a predefinable path and by means of predefinable ejection of paint from the paint material ejection device along the predefinable path a curved surface of an object to be painted is painted.

According to an exemplary embodiment, a use of an inkjet device for painting at least part of the surface of an aircraft is provided.

An fundamental idea of the invention may be seen in that a paint material ejection device may be guided along a guide device such that a curved surface of an object to be painted may be automatically painted by means of the paint material ejection device. The parameters, according to which the curved surface of the object is to be painted, may be entered into a control device so that said control device according to the predefined parameters may sequentially scan various surface regions of the curved surface of the object to be painted, and may cover the surface with paint material ejected from the paint material ejection device so that the curved surface of the object may be painted in a user-defined manner. This may make possible controlled painting of an object surface by means of a mechanically guided paint material ejection device whose ejection characteristics may be controlled by the control device.

An aspect of the invention may consist of the ability of any curved surface of an object to be painted to be scannable by the mechanically multi-dimensionally guidable paint material ejection device in accordance with the surface topology, and that it may for example be held at a constant predefinable distance from the surface. In this way any surface of an object, however complex its curvature, may be selectively covered with a homogeneous or a textured layer of paint. Since the control device may make it possible to scan the curved surface two-dimensionally or three-dimensionally by the paint material ejection device which may be movably suspended from the guide device, even complex surface textures may be painted with high local resolution and with a good quality finish. According to the invention, operating personnel may maintain an adequate safety distance from the ejected paint and may thus safely avoid health hazards. Painting may take place quickly and reliably.

The invention may provide particular advantages in that the paint material ejection device may be implemented as an inkjet device, and in that as an object an aircraft may be painted. According to this embodiment the aircraft may be painted with little expenditure and thus economically, wherein an inkjet device in a defined way, by means of a guide device, may travel along a region of the aircraft to be painted. By means of the inkjet device, paint may be ejected onto the curved aircraft surface to be painted.

According to the invention, painting of an object (in particular of an aircraft) may thus be implemented without expensive covering by adhesive means and may thus be significantly faster and more economical. Automatic painting may save specialist personnel and may avoid arduous and dangerous physical work in protective suits. Furthermore, this may avoid any risk to the health of painting personnel so that the health of painters may be protected and the incidence of illness may be reduced.

According to the invention, for example high-quality multicolour designs may be painted onto the surface to be painted, in particular printed on with inkjet. This may be possible at high resolution of 600 dpi and more. Thus, the invention may provide a method, as an alternative to applying film, for applying designs of any complexity to the surface of an object. In a way that may be different to the application of film, according to the invention the application of complex design on curved surfaces may also be possible.

Furthermore, in contrast to the state of the art, with the automated painting process or surface shaping process of the invention, three-dimensional microstructuring of the surface may be generated. In a manual painting process and in a film process this may be difficult, and in particular in surfaces that are curved in a multiple way this may be often impossible. In contrast to this, with the inkjet method according to the invention it may be possible to apply special paints with such different distribution that among other effects riblets or other aerodynamically advantageous surface structures may be created. Painting with a riblet effect or aerodynamic painting on the surface of an aircraft may make it possible to create a surface of aesthetically pleasing colour or topology and at the same time may support the aerodynamics of the aircraft because a suitable surface structure results in reduced frictional resistance.

In a scenario in which a riblet texture is entirely or partly damaged, for example as a result of wear and tear, this texture may be oversprayed by means of the inkjet method of the invention so that the original surface texture may be restored.

Thus, according to the invention, painting of aircraft, in particular of a rudder unit (fin), a winglet, a nacelle and/or a fuselage involving coloured or colourful designs such as logos, images and lettering, may be possible.

By means of a paint material ejection method, in particular an inkjet method, it may thus be possible to paint or repaint aircraft in a very short time in a painting line with the use of inkjet painting robots.

This results in important advantages to the manufacturer during initial painting, in particular because it may be associated with low costs and few human resources, with low risk to the health of employees, and with the possibility of quickly handing over a finished aircraft to productive operation so that said aircraft may commence regular operation earlier than is the case with a time-consuming manual painting process that often may take several days.

Furthermore, new options for repainting aircraft may open up, for example during sale, leasing, chartering or for advertising purposes, in particular for so-called low-cost airlines.

According to the invention, for example with the use of a suitable robot, one or several ink heads may be precisely positioned and brought to a desired paint material ejection position. Three-dimensional positioning and movement control for example may take place with the use of a laser measuring system. In this arrangement the paint material ejection device may preferably maintain a space of typically 1 mm from the curved surface to be painted.

From the jets of the ink heads (for example colour jets) paint may then be sprayed onto the aircraft surface in fine droplets. Suitable inkjet heads are for example piezo inkjet heads or thermo inkjet heads. Drying of the paint may be supported with the use of UV drying or infrared drying. In the case of multicoloured textures with different paints a suitable paint-dryer combination may be used which makes combined drying of all colours possible in minimum time.

The paint may be pumped from paint tanks into the paint reservoirs of the inkjet heads by way of hoses in that the pressure is controlled in accordance with the position of the inkjet head.

Preferably, after application of the layers of paint (for example layers of colour) to present a desired surface design, a transparent protective lacquer may be sprayed on. This protective lacquer may then also be applied with the use of an inkjet head.

In line with the respective aerodynamic requirements, microstructures may be applied, for example riblets. Riblets may be rib structures formed in a similar way to those known from shark skin; they may support favourable flow characteristics in particular on a surface of an aircraft. With riblets it may be possible to achieve reductions in air resistance or drag. Aircraft featuring riblet structures may save large quantities of fuel. Riblets thus result in significant reduction of air resistance (compare shark skin) and thus in an improvement in fuel savings. Regular checkups and, if necessary, renovation of surface textures may be achievable in an economical manner by means of the painting line implemented according to the invention.

For checking the surface a piezo ultrasound sensor or a laser sensor may be used which may be positioned together with the inkjet heads by means of a paint robot.

In the context of this invention the term "paint" or "lacquer" refers in particular to any coating material in liquid or powder form, which coating material can be applied to objects and can be built up by chemical or physical processes (for example evaporation of a solvent) to form a continuous film (coating film). Such paint or lacquer can for example comprise a binder, a solvent, fillers and/or pigments. The paint can comprise one or several colours or can be transparent. The paint can be such that it forms a texture, i.e. a three-dimensional structure, on the surface to which it is applied.

Preferred improvements of the invention are stated in the dependent claims.

Below, embodiments of the painting device according to the invention are described. These embodiments also apply to the painting arrangement, the method for painting the surface of an object, and the use according to the invention.

In another exemplary embodiment the painting device can be equipped for painting at least a part of the surface of an aircraft. If the painting device according to the invention is used for painting an aircraft, the cost of producing the aircraft may thus be reduced, and in particular the time required for painting may be significantly shortened so that an aircraft may enter service particularly quickly.

The invention may be used for painting any means of transport, for example an automobile, a ship etc.

In a further exemplary embodiment the painting device is adapted to paint the surface of a rudder unit, winglet, nacelle and/or fuselage.

In yet another exemplary embodiment the paint material ejection device of the painting device comprises a plurality of paint material ejection sub-devices which are equipped for ejecting different paint materials onto the surface of an object to be painted. Such paint material ejection sub-devices may be separate jets by means of which paint material (for example of different colours) may be sprayed onto the surface of an aircraft. The different paint material ejection sub-devices may be spatially arranged in such a way that they form a linear structure or a two-dimensional structure, i.e. a vector structure or matrix structure comprising individual jets, so that by means of targeted ejection of paint from one or a multitude of such jets a desired surface structure may be applied to the painted surface.

According to still a further exemplary embodiment the multitude of paint material ejection sub-devices is equipped for ejecting different paint materials of different colours onto a surface of an object to be painted. In this way it may be possible to economically apply coloured images, logos etc. to an object to be painted.

In yet still a further embodiment the multitude of paint material ejection sub-devices is equipped for ejecting paint materials for forming a three-dimensional texture on a surface of an object to be painted. According to this embodiment, for example riblet structures may be formed on the surface of an aircraft to be painted, as a result of which air resistance may be reduced as is the aircraft's fuel consumption. Such a three-dimensional structure may result from a spatial arrangement of different paint material ejection sub-devices.

According to another exemplary embodiment the paint material ejection device is an inkjet device comprising at least one inkjet head. Thus, the paint material ejection device may be designed in a way that is similar to that of an inkjet printer. Such an inkjet printing device may generate a printed image by means of targeted ejection or deflection of minute ink droplets. Inkjet devices may be generally divided into so-called CIJ inkjet devices (continuous inkjet), i.e. devices with continuous inkjet, and DOD inkjet devices (drop on demand), i.e. devices which eject individual droplets.

According to still another exemplary embodiment at least one inkjet head of the paint material ejection device implemented as an injection device is implemented as a piezo inkjet head or a thermo inkjet head.

According to a further exemplary embodiment the guide device comprises at least one guide rail to which the paint material ejection device is movably attached. For example, the paint material ejection device may be attached to a travelling trolley which may provided so as to be movable along such a guide rail. Controlled by the control device the paint material ejection device may move along the guide rail so that it may be moved in a targeted way into a position in which the paint material ejection device may eject paint onto the surface to be painted. Furthermore, the guide device itself may be provided so as to be movable in order to obtain overall three-dimensional mobility of the paint material ejection device.

By means of a position acquisition device a relative position of the paint material ejection device in relation to a surface of an object to be painted may be acquired. Furthermore, the position acquisition device may transmit an acquired relative position to the control device. By determining the current position of a paint material ejection device by means of a position acquisition device, the control device may check at any time whether or not positioning of the paint material ejection device may be correct. If necessary the control device may readjust the position.

According to still another embodiment the position acquisition device is in particular equipped for acquiring the distance of the paint material ejection device from a surface of an object to be painted. High-quality painting may often require that a certain (minimum-) distance between a surface to be painted and a paint material ejection device may be maintained, for example at most 1 mm.

According to a further exemplary embodiment the position acquisition device is equipped as a laser measuring system. Thus, a very precise and yet economical position acquisition may be possible.

According to another exemplary embodiment a drying device is provided which is equipped for drying a paint material ejected onto the surface of an object to be painted.

According to still another exemplary embodiment a paint material reservoir is provided in which paint material can be accommodated which can be fed to the paint material ejection device (for example by means of a hose connection).

According to a further exemplary embodiment the painting device according to the invention comprises a painting-process monitoring device which is equipped for monitoring a painted surface of an object. With such a painting-process monitoring device, which may for example comprise a laser sensor or a piezo ultrasound sensor, it may be possible to monitor the adequacy of the quality of a painted surface.

Below, an embodiment of the painting arrangement according to the invention is described. This embodiment also applies to the painting device, the method for painting the surface of an object, and to the use according to the invention.

According to another exemplary embodiment the painted object of the painting arrangement is an aircraft. In an aircraft the painting principle according to the invention may be used to particular advantage because it may make it possible to economically paint the aircraft and at the same time to possibly reduce the air resistance of an aircraft in that a three-dimensional texture may be painted on, which texture features may reduce air resistance.

Below, an embodiment of the method according to the invention for painting a curved surface of an object is described. This embodiment also applies to the painting device, the painting arrangement and the use according to the invention.

According to an exemplary embodiment, when the surface of the object to be painted has been painted, the painted surface is covered with a protective layer.

Such a protective layer may cover the actual paint on the surface of the object and may protect said surface against damage from exposure to the environment. Such exposure may for example relate to chemicals that are used at airports. Moreover, a conventional layer of paint may be damaged by the considerable air friction that may be experienced in particular during take-off and landing of the aircraft. If a protective layer is applied to this paint layer, such damage may be prevented.

Embodiments of the invention are shown in the figures and are explained in more detail below.

BRIEF DESCRIPTION OF THE DRAWINGS

The following are shown.

DETAILED DESCRIPTION

The representations shown in the figures are diagrammatical and not to scale.

Identical or similar components in different figures have the same reference signs.

Below, with reference to FIG. 1, a painting arrangement 100 according to a first embodiment of the invention is described.

The painting arrangement 100 comprises a fuselage 101 with a curved surface 102 to be painted and a painting device for painting the curved surface 102 of the fuselage 101.

Figure 1:
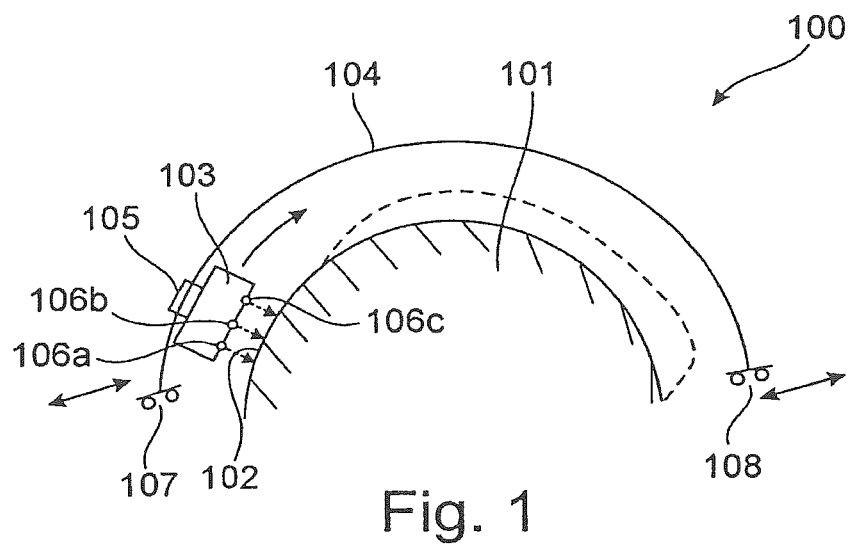
FIG. 1 a painting arrangement according to a first embodiment of the invention.

The painting device of FIG. 1 comprises an inkjet device 103, i.e. an inkjet printing unit which is equipped for ejecting paint material. The inkjet device 103 comprises a first paint jet 106a for ejecting red paint, a second paint jet 106b for ejecting yellow paint, and a third paint jet 106c for ejecting blue paint.

Furthermore, the painting device comprises a travelling element 105 and a semicircular guide rail 104, along which the travelling element 105 is movably attached. Thus the travelling element 105 can be moved along the guide rail 104, which according to FIG. 1 is semicircular in shape, so as to be able to scan different surface regions of the curved fuselage 101, or to provide paint to said surface regions. As shown in FIG. 1, the inkjet device 103 is rigidly coupled to the travelling element 105 so that by means of the guide device which comprises the guide rail 104 and the travelling element 105 the inkjet device 103 can be mechanically guided.

By means of a control device (not shown in FIG. 1) the inkjet device 103 and the travelling element 105 can be controlled on the guide rail 104 in such a way that by means of guiding the travelling element 105 along the guide rail 104 along a predefinable path and by means of predefinable ejection of paint from the inkjet device 106, or more precisely from the paint jets 106a to 106c, along the predefinable path a curved surface 102 of the fuselage 101 to be painted can be painted.

Moreover, the painting arrangement 100 comprises a first sliding element 107 which is attached to a first end section of the guide rail 104, and a second sliding element 108 which is attached to a second end section of the guide rail 104. The sliding elements 107, 108 comprise rollers by means of which the guide rail 104 can be slid in a direction which is essentially perpendicular to the drawing plane of FIG. 1. Consequently the surface 102 of the fuselage 101 can also be painted in a direction perpendicular to the drawing plane of FIG. 1.

The sliding elements 107, 108 in combination with the semicircular guide rail 104 make it possible for the inkjet device 103 to move along any curved surface and to cover said surface with paint.

In concrete terms, the components of the painting arrangement of FIG. 1 constitute a painting robot which is equipped for painting a fuselage 101.

Figure 2:
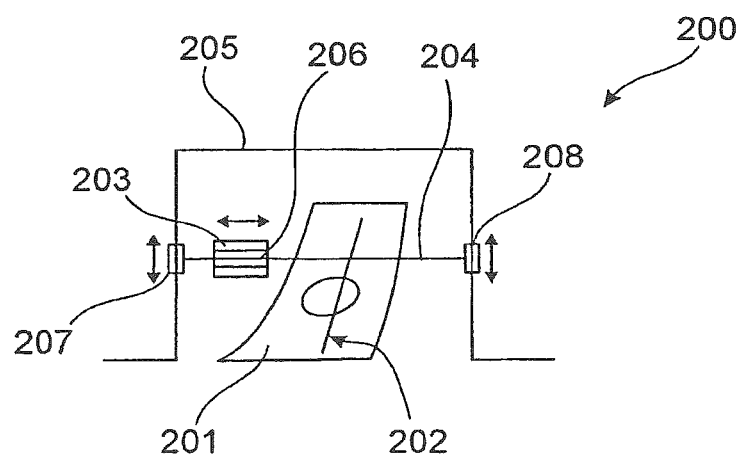
FIG. 2 a painting arrangement according to a second embodiment of the invention, FIG. 3 a painting arrangement according to a third embodiment of the invention, FIG. 4 a top view of a paint material ejection device of the invention, FIG. 5 a top view of another paint material ejection device of the invention, FIG. 6 a top view of a further paint material ejection device of the invention.

Below, with reference to FIG. 2 a painting arrangement 200 according to a second embodiment of the invention is described.

The painting arrangement 200 is arranged for painting a curved surface 202 to be painted of a rudder unit 201 of an aircraft. To this effect an inkjet device 203 comprising paint jets (not shown in FIG. 2) is moved along the curved surface 202 to be painted, and paint materials of different colours are ejected from the paint jets so as to apply a desired texture to the curved surface 202 to be painted. In a direction that is horizontal according to FIG. 2 the inkjet device can be slid along a first guide rail 204 by means of a first travelling element 206. Furthermore, the first guide rail 204 in two edge sections comprises a second travelling element 207 and a third travelling element 208, respectively which are attached to a second guide rail 205 so as to be slidable in vertical direction according to FIG. 2. Thus, by sliding the travelling elements 206 to 208 along the first or second guide rail 204, 205, two-dimensional scanning of the curved surface 202 to be painted by the inkjet device 203 can be achieved and thus defined painting of the surface 202 to be painted can be carried out.

The travelling elements 206 to 208 in combination with the first and second guide rails 204, 205 make it possible for the inkjet device 203 to travel along any curved surface and cover such surface with paint.

Below, with reference to FIG. 3 a painting arrangement 300 according to a third embodiment of the invention is described.

Figure 3:
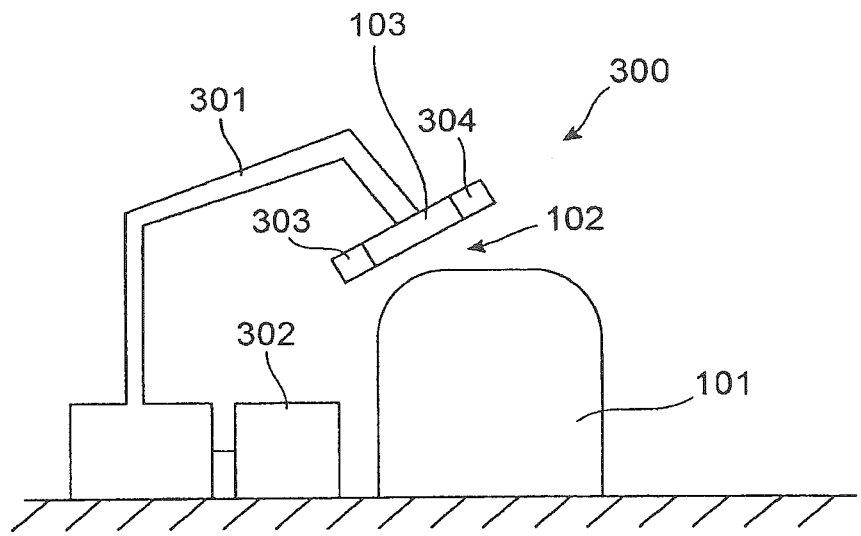

The painting arrangement 300 is equipped for painting a curved surface region 102, to be painted, of a fuselage 101 shown in cross section in FIG. 3. To this purpose the painting arrangement 300 comprises an inkjet device 103 with a plurality of spray jets by means of which the surface 102 to be painted can be covered with paint. The inkjet device 103 is attached to a guide robot 301 which can be controlled by means of a control computer 302. The guide robot 301 can guide the painting arrangement 300 along the surface region 102 to be painted so that the paint jets of the inkjet device 103 scan the surface 102 to be painted and cover said surface with paint according to a predefinable sequence.

The control computer 302 controls not only the timing of the ejection of paint from each of the paint jets of the inkjet device 103 but also mechanical guidance of the inkjet device 103 by means of the guide robot 301 along the surface 102 to be painted.

A paint-process monitoring laser sensor 303 is attached to an end section of the inkjet device 103, which laser sensor can radiate a laser signal to a painted surface and based on a detected laser response signal can check whether the painted surface has been properly painted. This can for example take place by means of an analysis of the reflection of the laser light that is reflected from the painted surface.

Furthermore, a position-acquisition laser measuring system 304 is provided with which the position of the paint jets of the inkjet device 103 can be measured. This information can be provided to the control computer 302 so that if necessary said control computer 302 can readjust the location of the inkjet device 103 based on the information transmitted.

Below, with reference to FIG. 4 a top view of a paint material ejection device 400 according to the invention is described.

The paint material ejection device 400 comprises a multitude of paint material ejection jets 401 arranged in a matrix shape. From each of the paint material ejection jets 401, controlled by means of a control device, paint material can be ejected onto a surface to be painted. For example, if a surface is to be formed as a topological three-dimensional surface texture, then in accordance with a desired surface texture only some of the paint material ejection jets 401 can be controlled to eject paint material. This feature can for example be used to form riblets on the surface of an aircraft, which riblets serve to reduce air resistance.

Figure 5:

Furthermore, with reference to FIG. 5 a paint material ejection device 500 according to another embodiment of the invention is described.

Figure 4:
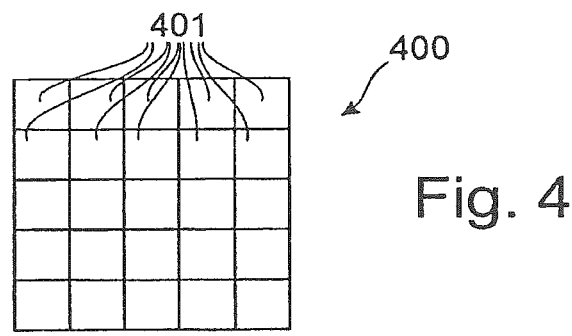

The paint material ejection device 500 of the invention differs from the paint material ejection device 400 shown in FIG. 4 in that the paint material ejection jets 401 are not implemented in a matrix-like manner but instead in a vector-like manner, i.e. as an elongated linear arrangement. The paint material ejection device 500 can for example be moved across a surface to be painted and at a definable location can form a one-dimensional structure of paint. In this way it is possible to gradually produce a matrix-like arrangement of painting regions and thus to produce a surface topology.

Figure 6:
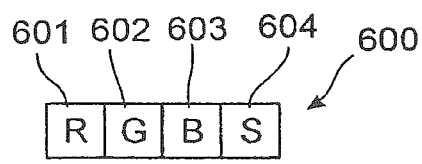

Below, with reference to FIG. 6 a paint material ejection device 600 according to a further embodiment is described.

The paint material ejection device 600 features a linear arrangement comprising a red-paint material ejection jet 601 for ejecting red paint; a yellow-paint material ejection jet 602 for ejecting yellow paint; a blue-paint material ejection jet 603 for ejecting blue paint; and a protective lacquer material ejection jet 604 for ejecting transparent protective lacquer. With the jets 601 to 603 a coloured paint layer can be formed which is composed of red, yellow and blue colour components. If a coloured paint is formed by means of the jets 601 to 603, then by means of the protective paint material ejection jet 604 transparent protective lacquer can be applied to the coloured paint layer formed in this way so as to passivate said coloured paint layer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for painting a curved surface of an object, comprising:
ejecting paint material from a paint material ejection device, wherein the paint material ejection device comprises a plurality of paint material ejection sub-devices, wherein the sub-devices are adapted to eject different paint materials onto the surface of an object to be painted, and wherein the plurality of sub-devices are adapted to eject paint materials for forming a three-dimensional texture on the surface of the object to be painted;
wherein the three-dimensional texture is arranged as a riblet structure;
mechanically guiding the paint material ejection device along a curved surface of an object by a guide device; and
controlling the paint material ejection device and the guide device by a control device in such a way that by guiding the paint material ejection device along a predefinable path, and by predefinable ejection of paint from the paint material ejection device along the predefinable path a curved surface of an object to be painted is painted.

2. The method of claim 1, further comprising:
covering the painted surface by a protective layer when the surface of the object to be painted has been painted.

3. The method of claim 1,
wherein the paint material ejection device is adapted to paint at least a part of the surface of an aircraft.

4. The method of claim 1,
wherein the paint material ejection device is adapted to paint at least a portion of the surface of a structure selected from the group consisting of a rudder unit, a winglet, a nacelle, and a fuselage of an aircraft.

5. The method of claim 1,
wherein the plurality of paint material ejection sub-devices are adapted to eject different paint materials of different colours onto the surface of the object to be painted.

6. The method of claim 1,
wherein the paint material ejection device further comprises
a position acquisition device adapted for acquiring a relative position of the paint material ejection device in relation to the surface of the object to be painted and further adapted for transmitting the acquired relative position to the control device.

7. The method of claim 6,
wherein the position acquisition device is adapted for acquiring the distance of the paint material ejection device from the surface of an object to be painted.

8. The method of claim 6,
wherein the position acquisition device is adapted as a laser measuring system.

9. The method of claim 1,
wherein the paint material ejection device further comprises
a drying device, adapted for drying a paint material ejected onto the surface of the object to be painted.

10. The method of claim 1,
wherein the paint material ejection device further comprises
a painting-process monitoring device which is adapted for monitoring a painted surface of an object.

11. The method of claim 1,
wherein the guide device is a rail.

12. The method of claim 11,
wherein the rail is semicircular.

* * * * *